United States Patent
Miyamoto et al.

(10) Patent No.: US 9,411,220 B2
(45) Date of Patent: Aug. 9, 2016

(54) LASER LIGHT SOURCE APPARATUS AND IMAGE DISPLAY APPARATUS THEREWITH

(75) Inventors: Noriyuki Miyamoto, Tokyo (JP);
Takayuki Yanagisawa, Tokyo (JP);
Shuhei Yamamoto, Tokyo (JP); Mitoru Yabe, Tokyo (JP); Yoko Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 126 days.

(21) Appl. No.: 14/352,733

(22) PCT Filed: Dec. 12, 2011

(86) PCT No.: PCT/JP2011/006926
§ 371 (c)(1),
(2), (4) Date: Apr. 18, 2014

(87) PCT Pub. No.: WO2103/088466
PCT Pub. Date: Jun. 20, 2013

(65) Prior Publication Data
US 2014/0300873 A1 Oct. 9, 2014

(51) Int. Cl.
*G03B 21/20* (2006.01)
*F21V 8/00* (2006.01)
*G02B 27/48* (2006.01)
*H04N 9/31* (2006.01)

(52) U.S. Cl.
CPC ............ *G03B 21/208* (2013.01); *G02B 6/0006* (2013.01); *G02B 27/48* (2013.01); *G03B 21/2033* (2013.01); *H04N 9/3152* (2013.01)

(58) Field of Classification Search
CPC .. G02B 27/48; G02B 6/0006; G03B 21/2033; G03B 21/208; H04N 9/3152
See application file for complete search history.

(56) References Cited

U.S. PATENT DOCUMENTS

| 2005/0072943 A1 | 4/2005 | Yamanaka et al. |
| 2008/0113302 A1 | 5/2008 | Takashima et al. |
| 2010/0002195 A1* | 1/2010 | Yagyu ................ G03B 21/2033 353/30 |
| 2010/0231862 A1* | 9/2010 | Itoh .................... G02B 27/0994 353/31 |

(Continued)

FOREIGN PATENT DOCUMENTS

| CN | 1604411 A | 4/2005 |
| JP | 2000-131665 A | 5/2000 |

(Continued)

OTHER PUBLICATIONS

Combined Chinese Office Action and Search Report issued Jun. 3, 2015 in Patent Application No. 201180075410.7 (with partial English language translation and English translation of categories of cited documents).

(Continued)

*Primary Examiner* — Sultan Chowdhury
*Assistant Examiner* — Magda Cruz
(74) *Attorney, Agent, or Firm* — Oblon, McClelland, Maier & Neustadt, L.L.P.

(57) ABSTRACT

A laser light source apparatus includes: a laser light source that emits a laser beam; a condenser lens that converges the laser beam emitted from the laser light source; and a light guide unit that propagates and outputs the laser beam converged by the condenser lens, and the laser beam converged by the condenser lens is made incident at an angle other than perpendicular to an incident end face of the light guide unit.

6 Claims, 3 Drawing Sheets

(56) References Cited

U.S. PATENT DOCUMENTS

2011/0141439 A1 6/2011 Yamauchi et al.
2011/0228233 A1 9/2011 Yagyu et al.

FOREIGN PATENT DOCUMENTS

| JP | 2003-156710 A | 5/2003 | | |
|---|---|---|---|---|
| JP | 2008 096777 | 4/2008 | | |
| JP | 2008 294108 | 12/2008 | | |
| JP | 2011 197468 | 10/2011 | | |
| WO | 2007 108504 | 9/2007 | | |
| WO | 2011 111158 | 9/2011 | | |
| WO | WO 2013114665 A1 * | 8/2013 | ......... | G02B 27/0927 |

OTHER PUBLICATIONS

Extended European Search Report issued Jun. 19, 2015 in Patent Application No. 11877446.2.

International Search Report Issued Mar. 6, 2012 in PCT/JP11/006926 Filed Dec. 12, 2011.

* cited by examiner

Laser Light Source Apparatus

Laser Light Source Apparatus

LASER LIGHT SOURCE APPARATUS AND IMAGE DISPLAY APPARATUS THEREWITH

TECHNICAL FIELD

The present invention relates to a laser light source apparatus used for illumination of a projector, and an image display apparatus that uses a laser beam emitted from the laser light source apparatus as a light source.

BACKGROUND ART

In a light source used for illumination of a projector and so on, the light source with a uniform angle intensity distribution is required to perform uniform images.

When an image display apparatus uses a laser beam as the light source, since coherence (coherency) of the laser beam is high, there emerges unevenness of brightness in light intensity (speckle) due to interference.

For example, in a case where beams from a single laser beam divided by an optical element are superimposed with each other, or in a case where the laser beam is scattered by fine unevenness on a surface of an optical element or its internal defect, the above unevenness of brightness emerges on a screen because of mutual interference of the laser beams.

When a laser beam with high coherence is employed, unevenness in light intensity due to speckle becomes large enough to be visually recognizable clearly, resulting in significant deterioration in image quality.

As an improvement measure therefor, there has been developed an image display apparatus equipped with a laser light source apparatus that outputs a light beam having a uniform illuminance distribution.

FIG. 6 is a configuration diagram showing an image display apparatus disclosed in Patent Document 1.

This image display apparatus is equipped with a laser light source apparatus that outputs a light beam with a uniform illuminance distribution; this laser light source apparatus is configured with: a laser light source 101 having a plurality of light emitting points each emitting a laser beam; a condenser lens 102 that converges the laser beams emitted from the plurality of light emitting points in the laser light source 101; and a diffusion element 103 that is arranged near a condensing point of the laser beam by the condenser lens 102 and has a hologram for widening a divergence angle of the laser beam.

The diffusion element 103 of the laser light source apparatus has a diffusion effect that widens the divergence angles of the laser beams in such a manner that two or more laser beams of a plurality of laser beams are overlapped with each other; thus, spatial coherency of the light beams after overlapping of the plurality of laser beams is decreased, so that unevenness in light intensity due to the speckle is reduced.

PRIOR ART DOCUMENTS

Patent Documents

Patent Document 1: Japanese Patent Application Laid-open No. 2008-96777 (FIG. 1)

SUMMARY OF THE INVENTION

Problems to be Solved by the Invention

Since a conventional laser light source apparatus is configured as mentioned above, because of the diffusion element 103 widening the angle intensity distribution of the laser beams, it is possible to decrease the spatial coherency of the light beams after overlapping of the plurality of laser beams. However, there is a problem such that a laser beam component spreading beyond NA of the optical system is generated, so that an optical loss thereof occurs.

On the other hand, in a case where an array-type semiconductor laser or a planar waveguide-type laser capable of performing a high output is employed, beam qualities thereof are different in two orthogonal directions; thus, the optical system is designed such that the beam having a worse quality is matched with the NA of the optical system. For this reason, the light from the laser light source concentrates around the center of the optical axis; thus, there is a problem such that it is difficult to achieve a uniform angular/spatial distribution.

The invention has been made to solve the foregoing problems, and an object of the invention is to provide a laser light source apparatus which can output a light beam with a uniform intensity distribution.

In addition, an object of the invention is to provide a laser light source apparatus which can output a luminous flux with a uniform intensity distribution while reducing an optical loss in an optical system.

Further, an object of the invention is to provide an image display apparatus to which the above laser light source apparatus can be applied.

Means for Solving the Problem

A laser light source apparatus according to the present invention includes: a laser light source in which an emitted laser beam is a laser beam having different spread angles in two orthogonal directions; a condenser lens that converges the laser beam emitted from the laser light source; and a light guide unit that propagates and emits the laser beam converged by the condenser lens, and it is thus configured that the beam in a direction having a smaller converging angle of the laser beam converged by the condenser lens is made incident at an angle other than perpendicular to an incident end face of the light guide unit.

According to the invention, there is provided with: a laser light source in which an emitted laser beam is a laser beam having different spread angles in two orthogonal directions; a condenser lens that converges the laser beam emitted from the laser light source; and a light guide unit that propagates and emits the laser beam converged by the condenser lens, and it is configured that the beam in a direction having a smaller converging angle of the laser beam converged by the condenser lens is made incident at an angle other than perpendicular to an incident end face of the light guide unit; thus, uniformity of an angular distribution of the intensity of the laser beam emitted from the light guide unit is enhanced, so that there is an advantageous effect such that a laser light source for illumination that enables a uniform illumination can be provided.

BEST MODE FOR CARRYING OUT THE INVENTION

Embodiment 1

Figure 1:
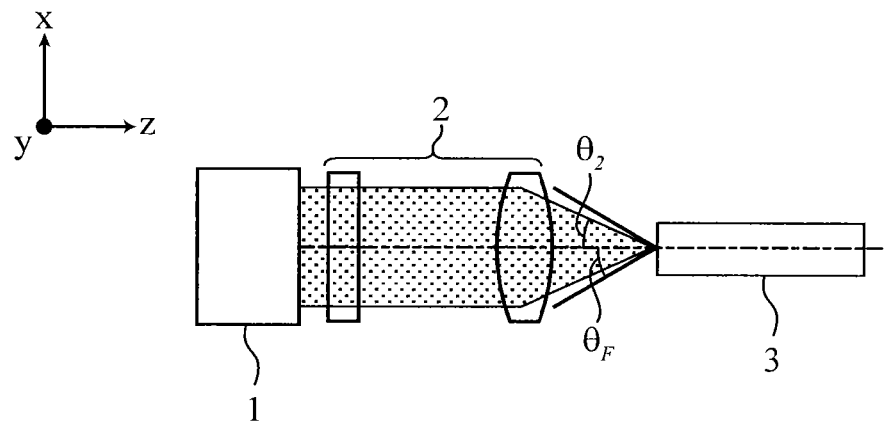
FIG. 1 is a top view showing a laser light source apparatus according to Embodiment 1 of the present invention.
Figure 2:
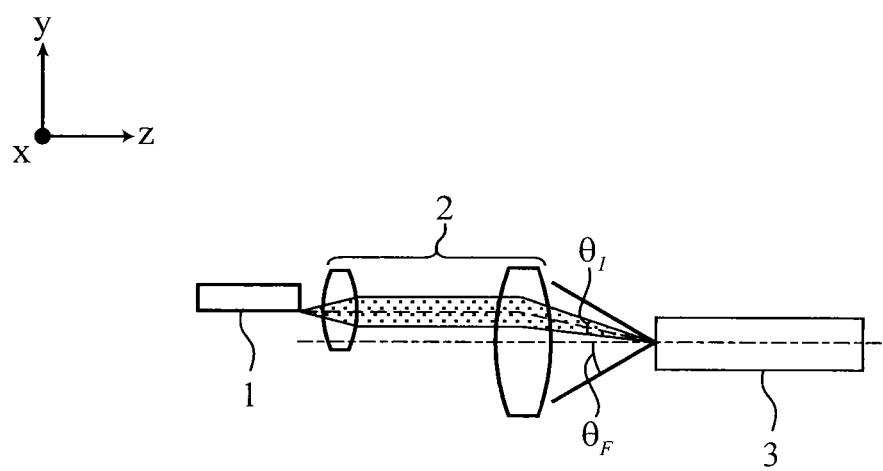
FIG. 2 is a side view showing the laser light source apparatus according to Embodiment 1 of the invention.

FIG. 1 is a top view (a bird's eye view in a y-axis direction in the figure) showing a laser light source apparatus according to Embodiment 1 of the present invention, and FIG. 2 is a side view (a bird's eye view in an x-axis direction in the figure) showing the laser light source apparatus according to Embodiment 1 of the invention.

In FIG. 1 and FIG. 2, a laser light source 1 is a light source that emits a laser beam of which the spread angle is different in two orthogonal directions.

It is noted that a common laser light source used for a light such as a multi-mode semiconductor laser, an array-type semiconductor laser, a wavelength conversion-type solid-state laser, and a planar waveguide-type laser are available as the laser light source 1.

A condenser lens 2 is an optical component for converging the laser beam emitted from the laser light source 1.

A light guide unit 3 is a member for propagating and emitting the laser beam converged by the condenser lens 2, and a multi-mode optical fiber or an integrator rod, for example, is used as the light guide unit 3.

It is noted that the beam in a direction having a smaller converging angle of the laser beam converged by the condenser lens 2 is made incident to an incident end face of the light guide unit 3 at an angle other than perpendicular.

Next, an operation thereof will be described.

When the multi-mode semiconductor laser, for example, is used as the laser light source 1, if the x-axis direction is taken from the two orthogonal directions as an oscillation direction in multi-mode, a beam quality in the x-axis direction becomes worse, while a beam quality in the y-direction gets better because a low-order mode oscillation is established in the y-axis direction, so that the beam qualities are different in the two orthogonal directions.

Further, when the array-type semiconductor laser is used as the laser light source 1, if the x-axis direction is taken as the array direction, similarly to the above, a beam quality in the x-axis direction becomes worse, while a beam quality in the y-direction gets better, so that the beam qualities are different in the two orthogonal directions.

Furthermore, when the planar waveguide-type laser is used as the laser light source 1, if the x-axis direction is taken as a direction in which the waveguide structure is prepared and the y-direction is given as a planer direction (spatially propagating direction), similarly to the above, a beam quality in the x-axis direction becomes worse, while a beam quality in the y-direction gets better, so that the beam qualities are different in the two orthogonal directions.

When the laser light source 1 emits the laser beam, the condenser lens 2 converges the laser beam, and causes the laser beam after convergence to enter the incident end face of the light guide unit 3.

Hereinafter, assuming that the laser light source 1 is the multi-mode semiconductor laser, how to converge and enter the laser beam will be described.

In FIG. 1 and FIG. 2, it is assumed that the x-axis direction is taken as a slow axis direction (oscillation direction in multi-mode) of the multi-mode semiconductor laser, and that the y-axis direction is taken as a fast axis direction (oscillation direction in single mode) of the multi-mode semiconductor laser.

In this case, with respect to the x-axis direction, a width of an emitter is generally from several hundreds of micrometers to several millimeters, and a divergent angle of the emitted beam from the laser light source 1 is generally about less than 10 degrees (in full angle).

Further, with respect to the x-axis direction, the beam quality is worse because of a multi-mode oscillation. For this reason, a converging half-angle $\theta_2$ in the x-axis direction to be converged by the condenser lens 2 provides a large convergence NA and fills most of an allowable incident angle $\theta_F$ of the light guide unit 3.

On the other hand, with respect to the y-axis direction, the width of the emitter (thickness of an active layer) has a nanometer order, and a divergent angle of the emitted light by the laser light source 1 is generally about 30 degrees (in full angle).

For this reason, among a plurality of lenses constituting the condenser lens 2, collimation of the laser beam is achieved by a cylindrical lens that is placed just behind the laser light source 1.

Further, with respect to the y-axis direction, because of a single mode oscillation, the beam quality is better, and the convergence NA becomes smaller, so that a converging half-angle $\theta_1$ in the y-direction becomes smaller.

Accordingly, the condenser lens 2 for converging the laser beam emitted from the laser light source 1 and causing the laser beam to enter the incident end face of the light guide unit 3 is configured with the cylindrical lens (for example, x-y asymmetric lens) that collimates the laser beam in the y-axis direction, and a relay lens system including a convex lens that converges the laser beam collimated by the cylindrical lens such that the beam size in the x-axis direction and the beam size in the y-axis direction become nearly equal, and that causes the laser beam after convergence to enter the incident end face of the light guide unit 3.

As mentioned above, the beam quality with respect to the x-axis direction is worse, while the beam quality with respect to the y-axis direction is better; thus, when the beam is made incident to the incident end face of the light guide unit 3 with converged using a convex lens such that the beam size in the x-axis direction and the beam size in the y-axis direction become nearly equal, the convergence NA in the y-axis direction only can be reduced.

For this reason, with respect to the y-axis direction, when the center axis of a light emitting point of the laser light source 1, or the center axis of the cylindrical lens in the condenser lens 2 is set at a position different to that on the center axis of the light guide unit 3, the laser beam in the y-axis direction can be made incident to the light guide unit 3 with inclined at an angle within the converging half-angle.

When the laser beam in the y-axis direction is made incident to the light guide unit 3 with inclined at an angle within the converging half-angle, an effect as illustrated in the following is obtained.

Figure 3:
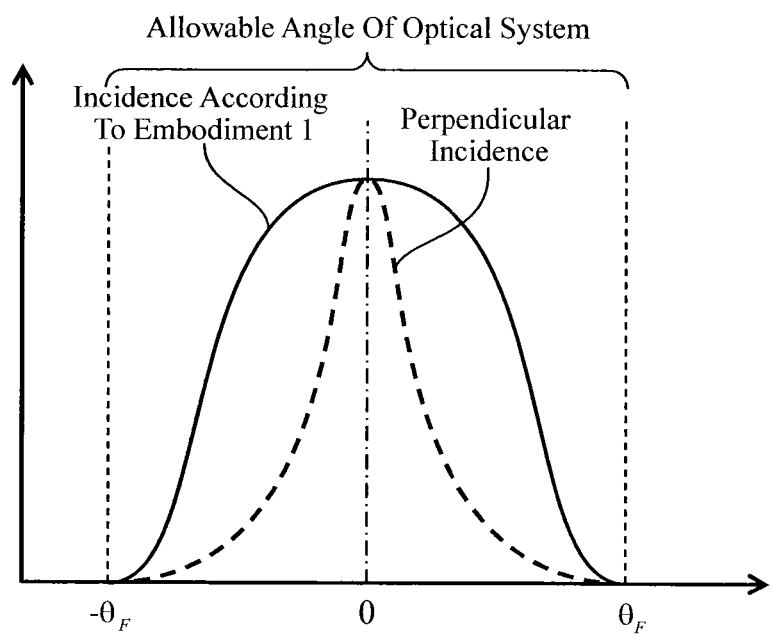
FIG. 3 is an illustration diagram showing a relationship between an intensity and an incident angle of a laser beam at an incident end face of a light guide unit 3 in a case where the laser beam in a y-axis direction is incident to the light guide unit 3 with inclined at an angle within a converging half-angle, and in a case where the laser beam is incident perpendicular to the incident end face of the light guide unit 3.

FIG. 3 is an illustration diagram showing a relationship between an intensity and an incident angle of the laser beam at the incident end face of the light guide unit 3 (hereinafter, referred to as "light angle intensity distribution"), in a case where the laser beam in the y-axis direction is incident to the light guide unit 3 with inclined at an angle within the converging half-angle, and in a case where the laser beam is incident perpendicular to the incident end face of the light guide unit 3 (in parallel to the center axis in a z-axis direction of the light guide unit 3). Note that a direction parallel to the center axis in the z-axis direction of the light guide unit 3 is zero degrees.

When the laser beam is made incident perpendicular to the incident end face of the light guide unit 3, since the beam quality in the y-axis direction is better, as shown in FIG. 3, the angle intensity distribution in the laser beam becomes higher around its center (around an angle of zero degrees).

Thus, when the laser beam is made incident perpendicular to the incident end face of the light guide unit 3, it is difficult to achieve a uniform distribution thereof with respect to the y-axis direction.

Further, the beam is propagated inside the light guide 3, while keeping its angle intensity distribution at the time of incidence, so that the intensity around the center becomes stronger in the angle intensity distribution even at an emitting end face of the light guide 3.

Accordingly, when the laser beam is made incident perpendicular to the incident end face of the light guide unit 3, the angle intensity distribution in the y-axis direction of the emitted light by the laser light source apparatus concentrates around the center, which makes it difficult to perform a uniform illumination thereof.

On the other hand, when the laser beam in the y-axis direction is made incident with inclined at an angle other than perpendicular, a light ray with a larger incident angle viewed from the light guide unit 3 increases as compared with that in the case of perpendicular incidence.

As mentioned above, the beam is propagated within the light guide 3 while the angle intensity distribution at the time of incidence is kept, so that the intensity of the light ray having a larger emitting angle increases even in the angle intensity distribution at the emitting end face of the light guide 3.

In this manner, when the laser beam in the y-axis direction is made incident with inclined at an angle other than perpendicular, the intensity of the light ray having a larger emitting angle increases; thus, uniformity of illumination thereof can be enhanced while an optical loss in the optical system is reduced.

Meanwhile, the laser beam emitted from a single light emitting point is highly coherent, and there occurs interference unevenness (speckle) due to a fine defect or unevenness of an optical element.

When the laser beam is made incident perpendicular to the incident end face of the light guide unit 3, the beam concentrates around the center in the angle intensity distribution of the laser beam in the direction of the better beam quality (y-axis direction, in the figure), so that the occurrence of the speckle is remarkable.

On the other hand, in a case where the laser beam in the y-axis direction is incident with inclined at an angle other than perpendicular, the intensity of the beam having a larger emitting angle increases as compared with the case of perpendicular incidence, so that speckle patterns caused by the laser beams incident on a screen (see FIG. 5) at different incident angles are different to each other. For this reason, the speckle patterns cancel each other to thereby reduce the speckle.

Thus, the better the uniformity of the angle intensity distribution, the more likely the speckle can be reduced.

In the above description, there is illustrated the effect in the case where the laser light source 1 emits the laser beam having different spread angles in the two orthogonal directions, and the laser beam in the direction having a smaller converging angle of the laser beam converged by the condenser lens 2 is made incident to the incident end face of the light guide unit 3 at an angle other than perpendicular. However, with respect to that effect, it is apparent that a similar effect can be achieved, even in a case of using a laser light source that emits a laser beam symmetrically with the same spread angle in all orientations, if the laser beam is made incident to the incident end face of the light guide unit 3 at an angle other than perpendicular.

Additionally, in Embodiment 1, the laser beam is incident with inclined at an angle other than perpendicular only in the direction of the better beam quality (y-axis direction, in the figure), and thus a reflected light on the incident end face of the light guide unit 3 does not return to the light emitting point of the laser light source 1. For this reason, instability such as a failure of the light source can be suppressed.

In Embodiment 1, as mentioned above, the multi-mode optical fiber, the integrator rod, or the like is used as the light guide unit 3.

When the multi-mode optical fiber, for example, is used as the light guide 3, the laser beam converged by the condenser lens 2 and entering the multi-mode optical fiber is propagated in the multi-mode optical fiber while repeating total reflection.

In this connection, if the optical fiber is placed linearly, the angle intensity distribution is retained in the propagation process in the optical fiber.

However, generally in many cases, the optical fiber is placed with bent arbitrarily. When light is propagated in the bent optical fiber, since the total reflection plane on the inner surface of the optical fiber is not flat, the angle intensity distribution is not completely retained as compared at the time of incidence and at the time of emission.

But, since the multi-mode optical fiber is larger in diameter, a change in the angle intensity distribution due to bending is not always significant. For this reason, even in a case where the multi-mode optical fiber is placed with bent arbitrarily, the angle intensity distribution at the time of incidence is almost retained in the angle intensity distribution of the laser beam emitted from the multi-mode optical fiber.

Accordingly, when the multi-mode optical fiber is used as the light guide unit 3, a laser light source for illumination having a high uniformity in the angle intensity distribution is obtained.

Further, when the laser beam is propagated by way of the optical fiber, since the wave front of the laser beam is distorted, it is possible to further enhance the reducing effect of the speckle.

Meanwhile, when an integrator rod is used as the light guide unit 3, the laser beam converged by the condenser lens 2 is made incident in a quadrangular lens (the rod lens) made of glass, and propagated while repeating total reflection inside the rod lens.

Thus, when the integrator rod is used as the light guide unit 3, while the angle intensity distribution is retained at the time of incidence and at the time of emission, an illuminance-distribution uniformizing effect is achieved at the exit of the rod lens, so that uniformity of illuminance thereof can be further enhanced.

In addition, because of the illuminance-distribution uniformizing effect at the exit of the rod lens, the reducing effect of the speckle can be further enhanced.

In Embodiment 1, there are shown the cases where the multi-mode optical fiber and the integrator rod are used as the light guide unit 3, not limited thereto; as far as the guide unit that can propagate light while retaining the angle intensity distribution at the time of incidence is provided, any configuration thereof is available.

Embodiment 2

In the above Embodiment 1, there is shown the case where with respect to the y-axis direction, the laser beam in the y-axis direction is incident to the light guide unit 3 with inclined at an angle within the converging half-angle in such a manner that the center axis of the light emitting point of the laser light source 1 or the center axis of the cylindrical lens in the condenser lens 2 is set at a position different to that on the center axis of the light guide unit 3; however, the laser beam in the y-axis direction may be incident to the light guide unit 3 with inclined at an angle larger than the converging half-angle.

Figure 4:
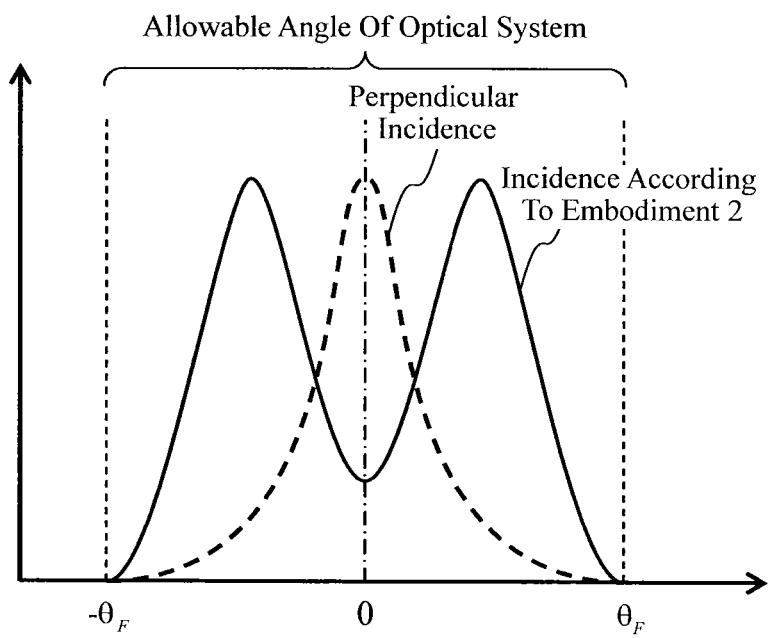
FIG. 4 is an illustration diagram showing a relationship between an intensity and an incident angle of a laser beam at an incident end face of a light guide unit 3 in a case where the laser beam in a y-axis direction is incident to the light guide unit 3 with inclined at an angle larger than a converging half-angle, and in a case where the laser beam is incident perpendicular to the incident end face of the light guide unit 3.

FIG. 4 is an illustration diagram showing a relationship between an intensity and an incident angle of a laser beam at an incident end face of a light guide unit 3 in a case where the laser beam in a y-axis direction is incident to the light guide unit 3 with inclined at an angle larger than a converging half-angle, and in a case where the laser beam is incident perpendicular to the incident end face of the light guide unit 3. Note that a direction parallel to the center axis in a z-axis direction of the light guide unit 3 is zero degrees.

When an integrator rod is used as the light guide unit 3, assuming that an incident angle of the laser beam is $\theta_1$ or more to an incident end face of the integrator rod, components thereof having a large emission angle increase while the laser beam repeats total reflection inside the integrator rod, so that the angle intensity distribution at the emitting end face of the integrator rod becomes, as shown in FIG. 4, a distribution in which the intensity of the beam having a large emission angle increases.

Thus, when the laser beam is incident to the light guide unit 3 with inclined at an angle larger than the converging half-angle, the intensity of the beam having a large emission angle can be increased, and thus uniformity of illumination thereof can be improved while suppressing an optical loss in the optical system.

As mentioned previously, speckle patterns caused by the laser beam that is incident on the screen (see, FIG. 5) at different incident angles are different to each other, so that the speckle patterns cancel each other to thereby reduce the speckle.

In Embodiment 2, since a light amount of the components having a large incident angle can be increased, the reducing effect of the speckle can be further enhanced as compared with the above Embodiment 1.

When the integrator rod is used as the light guide unit 3, since an illuminance-distribution uniformizing effect is achieved at the exit of the rod lens, the speckle can be further enhanced.

When a multi-mode optical fiber is used as the light guide unit 3, assuming that an incident angle of the laser beam is $\theta_1$ or more to the multi-mode optical fiber, a high-order mode is excited in the multi-mode optical fiber, which provides an angular distribution like that of a beam mode of one dimensional Gaussian distribution, so that components thereof having a large emission angle increase.

As mentioned above, since the angle intensity distribution is retained in the propagation process in the optical fiber, the angle intensity distribution at the emitting end face of the multi-mode optical fiber becomes, as shown in FIG. 4, a distribution in which the intensity of the beam having a large emission angle increases.

Thus, even when the multi-mode optical fiber is used as the light guide unit 3, there is provided a distribution in which the intensity of the beam having a large emission angle is increased at the emitting end face of the light guide unit 3, similarly to the case where the integrator rod is used as the light guide unit 3.

Further, when the laser beam is propagated by way of the optical fiber, since the wave front of the laser beam is distorted, the reducing effect of the speckle can be further enhanced.

In the above description, there is illustrated the effect in the case where the laser light source 1 emits the laser beam having different spread angles in the two orthogonal directions, and the laser beam in the direction having a smaller converging angle of the laser beam converged by the condenser lens 2 is made incident to the incident end face of the light guide unit 3 at an angle larger than the converging half-angle. However, with respect to that effect, it is apparent that a similar effect can be achieved, even in a case of using a laser light source that emits a laser beam symmetrically with the same spread angle in all orientations, if the laser beam is made incident to the incident end face of the light guide unit 3 at an angle larger than the converging half-angle.

Additionally, in Embodiment 2, the laser beam is incident with inclined at an angle larger than the converging half-angle only in the direction of the better beam quality (y-axis direction, in the figure), and thus a reflected light on the incident end face of the light guide unit 3 does not return to the light emitting point of the laser light source 1. For this reason, instability such as a failure of the light source can be suppressed.

Further, when the optical fiber is used as the light guide unit 3, a uniformizing effect occurs due to the fiber; the angle intensity distribution does not always become a shape in which the intensity around an angle of zero degrees becomes weaker (the shape of the angle intensity distribution shown in FIG. 4), and there may be a case of providing the shape as shown in FIG. 3.

Even in this case, it is apparent that an angular distribution uniformizing effect for a light source for illumination and a speckle reducing effect are achieved similarly to the case of the above Embodiment 1.

In Embodiment 2, effects other than the above are the same as those in the case of the above Embodiment 1.

Embodiment 3

Figure 5:
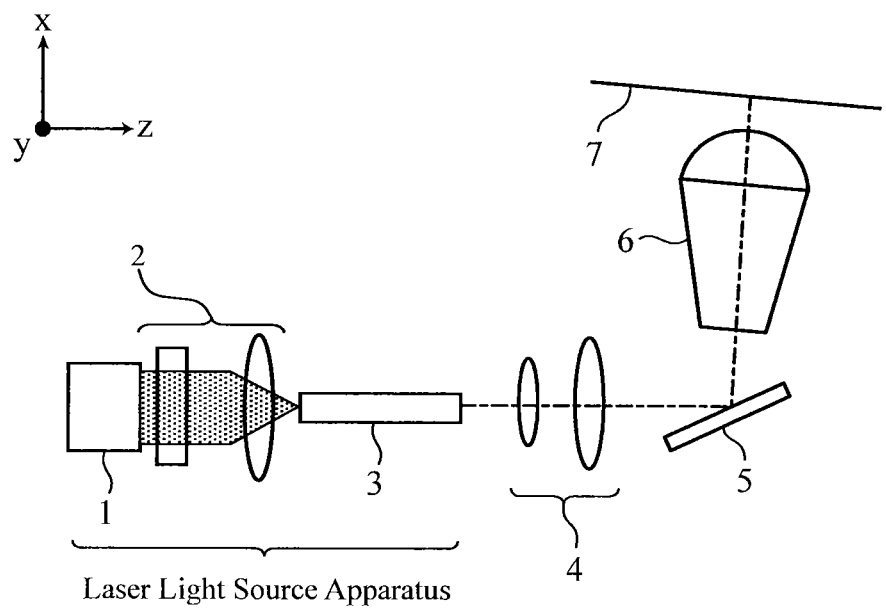
FIG. 5 is a configuration diagram showing an image display apparatus according to Embodiment 3 of the invention.
Figure 6:
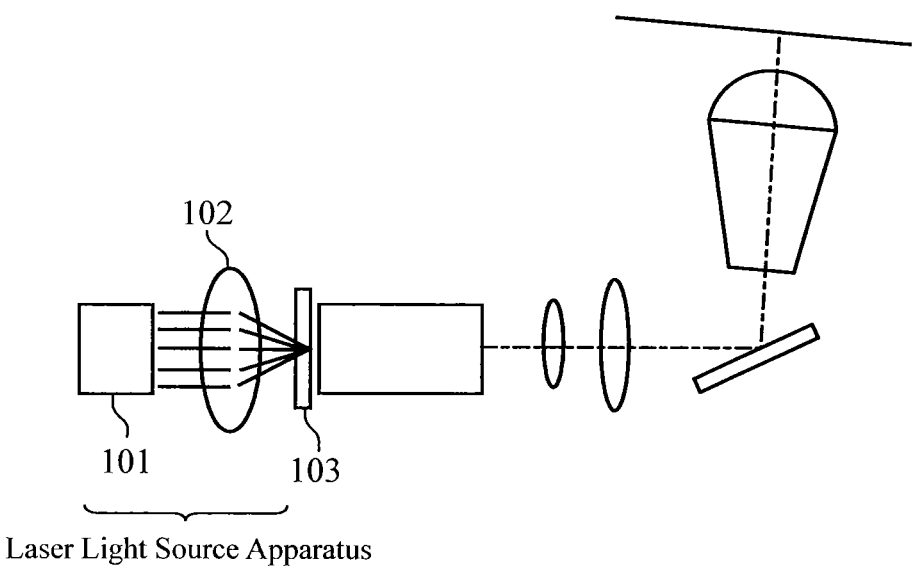
FIG. 6 is a configuration diagram showing an image display apparatus disclosed in Patent Document 1.

FIG. 5 is a configuration diagram showing an image display apparatus according to Embodiment 3 of the present invention, and in the drawing, the same reference numerals as those in FIG. 1 denote the same or equivalent parts, and their descriptions will be thus omitted.

A relay lens system 4 is an optical illumination system that passes the laser beam emitted from the light guide unit 3 of the laser light source apparatus to irradiate a light valve 5 with the laser beam.

The light valve 5 is an image display element that modulates spatially the laser beam irradiated by the relay lens system 4 according to an image signal input to the element.

A projection lens 6 is an optical projection system that projects on a screen 7 the laser beam modulated by the light valve 5.

In FIG. 5, although the light valve 5 that modulates spatially the laser beam irradiated by the relay lens system 4 is exemplified by a reflective-type light valve, a transmissive type light valve may be used instead.

Further, the structure and arrangement of the relay lens system 4, the light valve 5, the projection lens 6, and the screen 7 are not limited to the case of FIG. 5.

It is noted that when the image display apparatus is a rear projection-type image display apparatus, the screen 7 also becomes a component of the image display apparatus.

In a case where an integrator rod is used as the light guide unit 3 of the laser light source apparatus, and in a case where a multi-mode optical fiber is used as the light guide unit 3, similarly, the laser beam emitted from the light guide unit 3 reaches the screen 7 through the relay lens system 4, the light valve 5 and the projection lens 6 while retaining its angle intensity distribution, so that an intensity of large incident-angle components to the screen 7 is increased, which is effective in reduction of speckle.

Thus, a reducing effect of the speckle can be further enhanced in a case where the laser light source apparatus of the above Embodiment 2 is used as the image display apparatus of Embodiment 3 rather than a case where the laser light source apparatus of the above Embodiment 1 is used.

It is noted that the present invention can be implemented by a free combination of the embodiments, a modification of arbitrary components of the embodiments, or an omission of arbitrary components of the embodiments, within the scope of the invention.

INDUSTRIAL APPLICABILITY

The laser light source apparatus according to the invention is suitable for an image display apparatus that is required to reduce unevenness in light intensity due to speckle to thereby suppress image degradation.

DESCRIPTION OF REFERENCE NUMERALS AND SIGNS

1: laser light source, 2: condenser lens, 3: light guide unit, 4: relay lens system (illumination optical system), 5: light valve (image display element), 6: projection lens (projection optical system), 7: screen, 101: laser light source, 102: condenser lens, 103: diffusion element.

The invention claimed is:

1. A laser light source apparatus, comprising:
a laser light source in which an emitted laser beam is a laser beam having different spread angles in two orthogonal directions;
a condenser lens that converges the laser beam emitted from the laser light source; and
a light guide unit that propagates and emits the laser beam converged by the condenser lens,
wherein the beam in a direction having a smaller converging angle of the laser beam converged by the condenser lens is made incident at an angle other than perpendicular to an incident end face of the light guide unit.

2. The laser light source apparatus according to claim 1, wherein the laser beam converged by the condenser lens is made incident at an angle larger than a converging half-angle of the laser beam to the incident end face of the light guide unit.

3. The laser light source apparatus according to claim 1, wherein the laser beam in a direction having a smaller converging angle of the laser beams converged by the condenser lens is made incident at an angle larger than a converging half-angle of the laser beam to the incident end face of the light guide unit.

4. The laser light source apparatus according to claim 1, wherein an integrator rod is used as the light guide unit.

5. The laser light source apparatus according to claim 1, wherein a multi-mode optical fiber is used as the light guide unit.

6. An image display apparatus comprising:
light source apparatus of claim 1;
an illumination optical system that performs irradiation with a laser beam emitted from a light guide unit of the laser light source apparatus;
an image display element that spatially modulates the laser beam irradiated by the illumination optical system according to an image signal to be input; and
a projection optical system that projects on a screen the laser beam modulated by the image display element.

* * * * *